May 25, 1926.  
C. H. LOEW  
1,585,777  
MACHINE FOR APPLYING CLAMPING RINGS TO OBJECTS  
Filed March 13, 1924   2 Sheets-Sheet 1
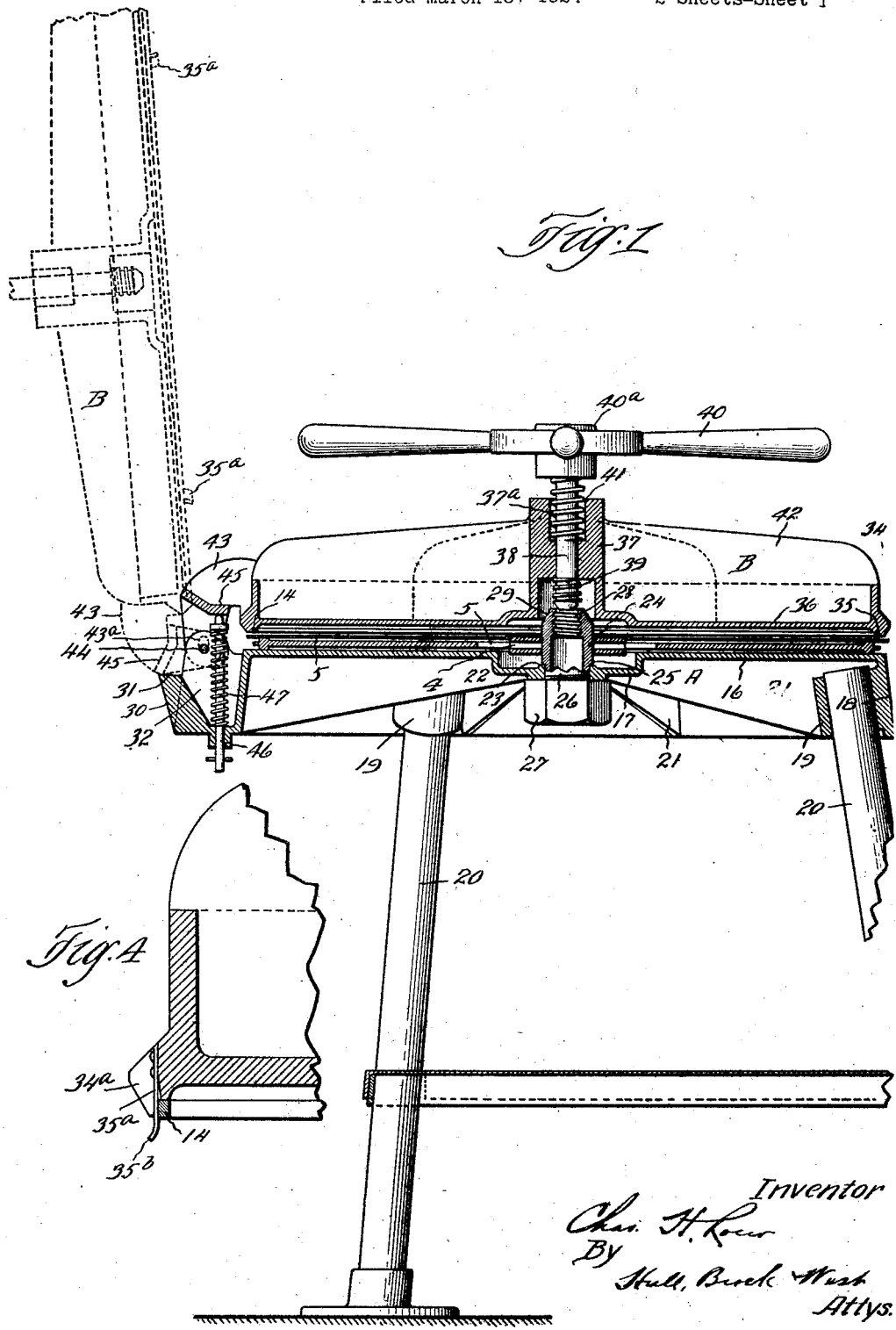

May 25, 1926.
C. H. LOEW
1,585,777
MACHINE FOR APPLYING CLAMPING RINGS TO OBJECTS
Filed March 13, 1924   2 Sheets-Sheet 2
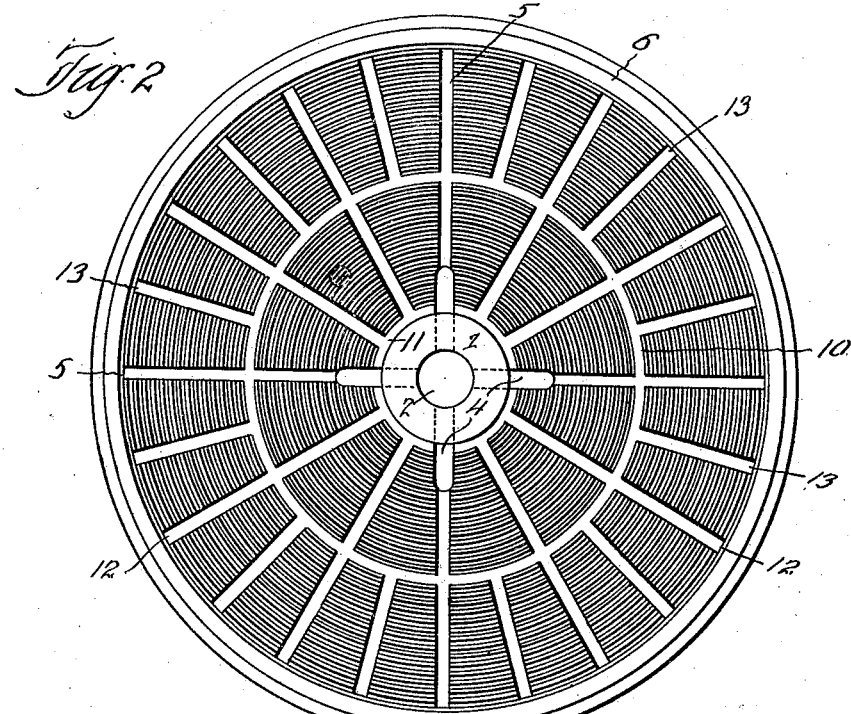
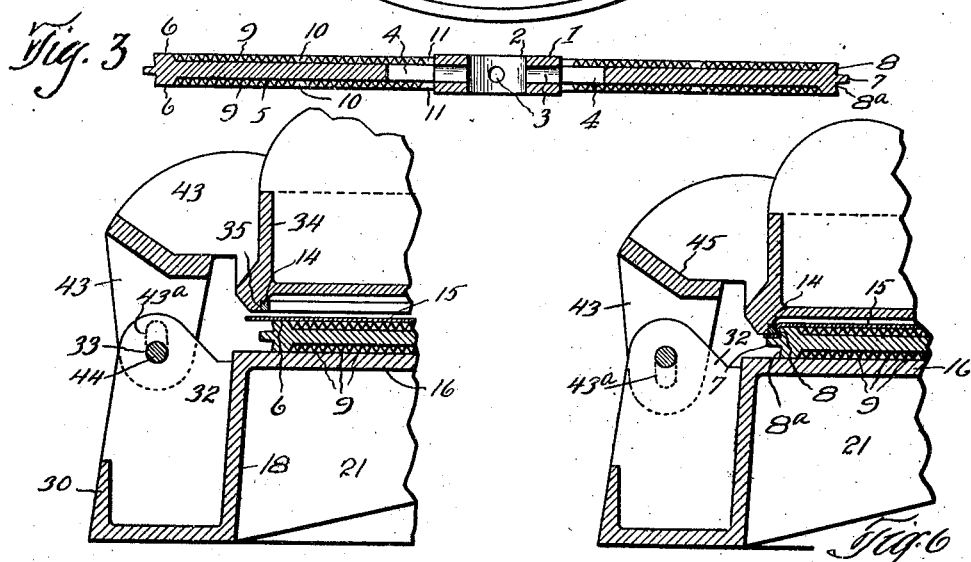
Inventor
Chas. H. Loew
By Hull, Buck & West
Attys.

Patented May 25, 1926.

1,585,777

UNITED STATES PATENT OFFICE.

CHARLES H. LOEW, OF AVON LAKE, OHIO, ASSIGNOR TO THE LOEW MANUFACTURING COMPANY, OF CLEVELAND, OHIO, A CORPORATION OF OHIO.

MACHINE FOR APPLYING CLAMPING RINGS TO OBJECTS.

Application filed March 13, 1924. Serial No. 698,867.

This invention relates to machines which are designed for applying clamping rings to the peripheral portions of objects and is especially designed for the purpose of applying clamping rings to the peripherial portions of filter plates for the purpose of securing filtering sheets thereto. The machine shown herein is particularly well adapted to apply clamping rings to the peripheral portions of filter plates of the type shown in my copending application No. 698,866 filed March 13, 1924.

It is the general purpose and object of the invention to provide a machine of this character which is simple in construction and economical of production, but which is capable of realizing the objects for which it is designed in a very efficient manner.

The foregoing objects will be accomplished in and through the construction shown in the accompanying drawings, wherein Fig. 1 represents a vertical sectional elevation of a machine embodying my invention, the receiving position of its ring-receiving and applying member being shown in dotted lines; Fig. 2 illustrates a plan view of a filter plate of the type with which the machine shown in Fig. 1 is particularly adapted to cooperate; Fig. 3 illustrates a transverse, central sectional view through the said plate; Fig. 4 is a sectional detail through the lower part of the ring-applying member; Fig 5 is a similar detail through the bottom of the ring-applying member and the top of the table or supporting member, showing the positions of the parts prior to applying a ring to the filter plate; and Fig. 6 is a similar view showing the positions of the parts at the time when the ring is applied to the plate.

The machine described herein consists generally of a table having a top constituting a base member A upon which the filter plate is supported, with a ring-applying member B pivoted at one side of the top and having means for temporarily holding a ring, together with means for applying the ring to its peripheral seat upon the filter plate or other object.

As the machine is particularly intended to operate upon a filter plate of a type wherein the filtering sheets are drawn over the periphery of the plate and secured thereto by rings, a brief description of a plate of this character will now be given, the said plate being shown in detail in Figs. 2 and 3.

The plate comprises a central hub 1 having a central bore 2 therethrough, with radial passages 3 extending outwardly from said bore, through said hub, the said radial passages merging with through-passages 4 in the plate, and the ends of these passages in turn communicating with radial channel 5, which extend on each side of the plate to an annular marginal ledge 6. The periphery of the plate comprises a central radially extending circumferential rib 7, the upper and lower surfaces of the periphery forming two reversely extending cone frusta 8 and 8$^a$, each having its smaller base adjacent to the rib. The plate is preferably provided with circumferential triangular ribs on opposite sides thereof, between the ledges 6 and the hub 2, with an annular channel 10 on each side of the plate, between the ledges and hub, and an annular channel 11 on opposite sides thereof adjacent to the hub; also with long radial ribs 12 extending from each ledge inwardly to the channel 11 and with short radial ribs 13 extending from each ledge to the channel 10.

A complete filtering element comprises a filter plate such as described with the opposite faces thereof covered with one or more sheets of filtering material extending from the bore 2 outwardly across the ledges 6, along the surfaces 8 and 8$^a$ and preferably along the upper and lower surfaces of the rib 7, together with the clamping rings which hold the peripheral portions of the filter sheets upon the seats formed by such surfaces. One of the clamping rings is shown at 14 in Figs. 1, 4, 5, and 6, and a sheet of filtering material for one of the surfaces of the plate is shown at 15 in the same views, the ring and the peripheral part of the sheet 15 being shown in Fig.

6 in the positions which they occupy upon the assembled filtering element.

For the purpose of applying the rings to their peripheral seats, the machine shown in Figs. 1, 4, 5 and 6 is used. This machine comprises the member A having a table top 16 provided with a central circular depression 17 therein and with a short depending skirt 18 having sockets 19 for the legs 20, the top being shown as strengthened by the radial ribs 21 extending between the skirt and the depression 17. The central depression 17 is provided with a central aperture 22 in the bottom thereof, with an annular shoulder 23 surrounding the upper end of the aperture and projecting above the bottom of the depression. This shoulder forms a seat for a hollow stud having an upper body portion 24 provided with an annular shoulder 25 at the bottom thereof resting on the shoulder 23, and with a reduced neck or stem 26 fitting within the bore 22 and extending therethrough and provided at its lower end with a nut 27 by means of which the stud is drawn to its seat on the shoulder 23. The upper end of the stud is provided with a bore having an internal thread 28, and the upper end of the stud is preferably beveled or frustro-conical, as shown at 29, to facilitate the application of the hub of a filter plate thereto.

The skirt 18 is provided with an outwardly extending pocket at one side thereof, the outer wall of the pocket being indicated at 30 and having a seat 31 at its upper edge for the member B. Extending between the outer wall of the pocket and the skirt are a pair of ears 32, the said ears being provided with horizontally aligned apertures, one of which is indicated at 33.

The ring applying member B of the machine is in the form of a cover comprising a circular peripheral ring 34 having in the lower face thereof an annular recess 35 which receives the outer and upper surfaces of the ring 14, the top of the annular recess forming a thrust surface for applying the ring 14 to its seat on the filter plate. At suitable intervals, the thickened bottom of the ring 34 is slotted, as indicated at 34ª (Fig. 4) thereby to expose the outer cylindrical surface of the clamping ring 14; and a spring tongue 35ª, mounted in each such slot, yieldingly holds the ring 14 to its seat. The lower end of each spring tongue is bent outwardly as shown at 35ᵇ, to facilitate the application of a ring 14 to the annular seat. A web 36 extends inwardly from the ring 35 and has formed with the central portion thereof a hub 37 in which is rotatably mounted the unthreaded shank 38 of a screw 39, the screw being adapted to be threaded into the top of the socket 24 by rotating the shank 38 by means of the handles 40. The upper end of the hub 38 is provided with a recess 37ª which receives the lower portion of a helical spring 41, the upper end of which bears against the hub 40ª to which the handles 40 are connected. The member B is provided with radial strengthening ribs 42 extending from the ring 34 to the central hub 37.

Extending from the ring-carrying and applying member B is a hinge lug or projection 43 which depends between the ears or lugs 32 and is provided with a vertically extending slot 43ª and through which slot and the apertures 33 extends a hinge pin or pivot 44. Extending laterally from the hinge member 43 is a projection 45 which, when the member B is lowered, is adapted to engage the upper end of a rod 46, which is pushed upwardly by a spring 47, the rod and spring serving to cushion the descent of the member B and to hold said member in the elevated position shown in full lines in Fig. 1, with the ring 14 above and parallel with the table top or base member, the rod holding the hinge lug 43 elevated, with the pin 44 at the bottom of the slot 43ª.

With the parts constructed and arranged as described, the operation will be readily understood.

When it is desired to apply one of the filter sheets 15 and a clamping ring 14 to a filter plate, the member B is swung backwardly to the position shown in dotted lines in Fig. 1, with part of its hinge member resting on the seat 41. This enables the clamping ring to be readily applied to the annular seat 35, the ring being retained upon said seat by the fingers 35ª. The member B is then swung down about its hinge, with the projection 45 engaging the top of the rod 46, which eases the member B downwardly, the slot 43ª insuring parallelism between the seat 35 and the top of the table. The operator then pushes downwardly upon the handles 40, inserting the lower threaded end of the shank 38 into the top of the stud 24; then, by turning the handles and at the same time bearing down thereon, the shank will be threaded into the stud, yieldingly pushing the member B toward the member A; this movement being accommodated and the parts preserved in parallelism by means of the slot 43ª.

As the ring 14 fits fairly loosely in its seat 35, being held therein by the spring fingers 35ª, when the ring is in the position indicated in Fig. 6, the filter sheet is properly clamped at its edge and the ring will remain upon the peripheral portion of the filter plate when the shank 38 is rotated in the reverse direction and the member B is swung to the position shown in Fig. 1.

It will be observed that the machine is extremely simple in construction, but is markedly efficient in accomplishing the results for which it is designed.

Having thus described my invention, what I claim is:—

1. In a machine for applying clamping rings to the peripheral portions of articles, the combination of a base member on which such article is supported, a member movable toward and from the first-mentioned member and having an annular thrust surface opposed to the first-mentioned member, a ring bearing against said thrust surface, and means yieldingly holding said ring in engagement with such surface.

2. In a machine for applying clamping rings to the peripheral portions of articles, the combination of a base member on which such article is supported, a member movable toward and from the first-mentioned member and having an annular thrust surface opposed to the first-mentioned member, a ring bearing against said thrust surface, and means removably holding said ring in engagement with such surface.

3. In a machine for applying clamping rings to the peripheral portions of articles having each a central opening, the combination of a supporting base having a central stud adapted to enter and extend through such opening, a member having an annular seat for such ring and means for removably retaining the ring on said seat, and means carried by the second member and cooperating with said stud for forcing the second member toward the first member, thereby to move the said clamping ring into engagement with the peripheral seat on said article.

4. In a machine for applying clamping rings to the peripheral portions of articles having each a central opening, the combination of a supporting base, a member having an annular seat for such ring and means for removably retaining the ring on said seat, one of said members having a projection adapted to fit said openings, and means for forcing the second member toward the first member thereby to move the said clamping ring into engagement with the seat of said article.

5. In a machine for applying clamping rings to the peripheral portions of articles having each a central opening, the combination of a supporting member having a stud adapted to fit the said opening, a member hinged to the first-mentioned member and having an annular seat for said ring and means for temporarily retaining the ring on said seat, a hub carried by the second member, and a threaded stem mounted in said hub and adapted to engage the said stud thereby to draw the two members together and force the said ring upon the periphery of the said article.

6. In a machine for applying clamping rings to the peripheral portions of articles having each a central opening, the combination of a supporting member having a stud adapted to fit the said opening, a member hinged to the first-mentioned member and having an annular seat for said ring and means for temporarily retaining the ring on said seat, a hub carried by the second member, a threaded stem mounted in said hub and adapted to engage the said stud thereby to draw the two members together and force the said ring upon the periphery of the said article, the said hinge comprising cooperating hinge members carried by the two first-mentioned members, with a pin-and-vertical slot connection between said hinge members.

7. In a machine for applying clamping rings to the peripheral portions of articles, the combination of a supporting member, a member hinged to the first-mentioned member and having an annular seat for said ring and means for temporarily retaining the ring on said seat, the said hinge comprising cooperating hinge members carried by the two first-mentioned members, with a pin-and-vertical slot connection between said hinge members, resilient means tending to hold the first two members apart when the second member is moved about its pivot toward the first member, and means for moving the second member in operative relation to the first member and against such resistance.

8. In a machine for applying clamping rings to the peripheries of articles having each a central opening, the combination of a supporting member having a stud adapted to fit within the opening of each such article, a member hinged at one side to the first-mentioned member and having an annular seat for such clamping rings and means for temporarily retaining a ring on such seat, a hinge connection between the said members comprising a hinge lug carried by one of the members and a pair of hinge lugs carried by the other member, a hinge pin extending through said lugs, and a lost-motion connection between one of such lugs and said pin, a projection extending from the hinge lug on the second member, a spring-pressed pin carried by the other member and adapted to engage such projection when the second member is moved toward the first member, and means carried by the second member and cooperating with the said stud for drawing the members together thereby to apply the ring on said seat to the periphery of said article.

9. In a machine of the character described, the combination of a supporting member, a member having an annular ring seat with means for temporarily retaining a ring on said seat, and means for moving one of said members toward and from the other thereby to apply the said ring to its co-operating member, 10. In a machine of the character described, the combination of a supporting member, a member hinged to the supporting member and having an annular seat for a ring and means for temporarily retaining a ring on said seat, yielding means tending to hold the second member from the first member when moved in opposition thereto about its hinge, and means for forcing the second member toward the first member and for maintaining the said seat parallel with the first member during such movement.

In testimony whereof, I hereunto affix my signature.

CHARLES H. LOEW.